(12) United States Patent
Yang et al.

(10) Patent No.: US 12,505,265 B2
(45) Date of Patent: Dec. 23, 2025

(54) ARTIFICIAL INTELLIGENCE-BASED URBAN DESIGN MULTI-PLAN GENERATION METHOD FOR REGULATORY PLOT

(71) Applicant: SOUTHEAST UNIVERSITY, Jiangsu (CN)

(72) Inventors: Junyan Yang, Jiangsu (CN); Xiao Zhu, Jiangsu (CN); Yi Shi, Jiangsu (CN); Beixiang Shi, Jiangsu (CN); Jiyao Cai, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 1014 days.

(21) Appl. No.: 17/611,740

(22) PCT Filed: Jan. 6, 2021

(86) PCT No.: PCT/CN2021/070479
§ 371 (c)(1),
(2) Date: Nov. 16, 2021

(87) PCT Pub. No.: WO2022/126806
PCT Pub. Date: Jun. 23, 2022

(65) Prior Publication Data
US 2022/0309202 A1    Sep. 29, 2022

(30) Foreign Application Priority Data

Dec. 18, 2020    (CN) .......................... 202011503007.7

(51) Int. Cl.
*G06F 30/13*    (2020.01)
*G01C 21/00*    (2006.01)
(Continued)

(52) U.S. Cl.
CPC ......... *G06F 30/13* (2020.01); *G01C 21/3852* (2020.08); *G06F 30/12* (2020.01); *G06F 30/27* (2020.01); *G06F 2111/18* (2020.01)

(58) Field of Classification Search
None
See application file for complete search history.

(56) References Cited

U.S. PATENT DOCUMENTS

2012/0116728 A1*  5/2012  Shear ...................... G06F 17/50
                                                                703/1
2019/0147120 A1*  5/2019  Benjamin ............... G06F 17/50
(Continued)

FOREIGN PATENT DOCUMENTS

CN    106599332 A      4/2017
CN    107390866 A  *  11/2017   .......... G06F 18/2411
(Continued)

OTHER PUBLICATIONS

S. Strothoff, D. Feldmann, F. Steinicke, T. Vierjahn and S. Mostafawy, "Interactive generation of virtual environments using MUAVs," 2011 IEEE International Symposium on VR Innovation, Singapore, 2011, pp. 89-96, doi: 10.1109/ISVRI.2011.5759608. (Year: 2011).*
Galin, E., Peytavie, A., Marechal, N. and Guérin, E. (2010), Procedural Generation of Roads. Computer Graphics Forum, 29: 429-438. https://doi.org/10.1111/j.1467-8659.2009.01612.x (Year: 2010).*

(Continued)

*Primary Examiner* — Rehana Perveen
*Assistant Examiner* — Kyle H Tseng
(74) *Attorney, Agent, or Firm* — MUNCY, GEISSLER, OLDS & LOWE, P.C.

(57) ABSTRACT

The present invention discloses an artificial intelligence (AI)-based urban design multi-plan generation method for a regulatory plot. The method includes operation steps performed by the following modules: (1) plot space calculation sand table module; (2) regulatory characteristic parameter input module; (3) characteristic case intelligent learning module; (4) plot road intelligent generation module; (5) plot (Continued)

landscape intelligent generation module; (6) plot architecture intelligent generation module; and (7) outputted plan auxiliary drawing module. By means of the AI-based urban design multi-plan generation method for a regulatory plot of the present invention, the planners realize real-time, accurate, and efficient feedback adjustment to a plurality of urban design plans under regulatory conditions, resolving a plurality of problems such as a long working period of a conventional design plan.

2 Claims, 3 Drawing Sheets

(51) Int. Cl.
  *G06F 30/12* (2020.01)
  *G06F 30/27* (2020.01)
  *G06F 111/18* (2020.01)

(56) References Cited

U.S. PATENT DOCUMENTS

| | | | |
|---|---|---|---|
| 2019/0213286 | A1 | 7/2019 | Bauer et al. |
| 2019/0272324 | A1 | 9/2019 | Esposito et al. |

FOREIGN PATENT DOCUMENTS

| | | | |
|---|---|---|---|
| CN | 111985774 | A | 11/2020 |
| CN | 112052503 | A | 12/2020 |

OTHER PUBLICATIONS

G. Dias Fernandes and A. R. Fernandes, "Space Colonisation for Procedural Road Generation," 2018 International Conference on Graphics and Interaction (ICGI), Lisbon, Portugal, 2018, pp. 1-8, doi: 10.1109/ITCGI.2018.8602928. (Year: 2018).*

Fang, Zhou, Ying Jin, and Tianren Yang. "Incorporating planning intelligence into deep learning: A planning support tool for street network design." arXiv preprint arXiv:2010.04536 (2020) (Year: 2020).*

Bao, Jianmin, Dong Chen, Fang Wen, Houqiang Li, and Gang Hua. "CVAE-GAN: fine-grained image generation through asymmetric training." In Proceedings of the IEEE international conference on computer vision, pp. 2745-2754. 2017. (Year: 2017).*

Habbecke, M., Kobbelt, L. (2012). Automatic Registration of Oblique Aerial Images with Cadastral Maps. In: Kutulakos, K.N. (eds) Trends and Topics in Computer Vision. ECCV 2010. Lecture Notes in Computer Science, vol. 6554. Springer, Berlin, Heidelberg. https://doi.org/10.1007/978-3-642-35740-4_20 (Year: 2010).*

Parish, Yoav IH, and Pascal Müller. "Procedural modeling of cities." In Proceedings of the 28th annual conference on Computer graphics and interactive techniques, pp. 301-308. 2001. (Year: 2001).*

Teoh, Soon Tee, and T. Soon Tee. "Algorithms for the Automatic Generation of Urban Streets and Buildings." In CGVR, pp. 122-128. 2008. (Year: 2008).*

Jiang Yang, "The Research on Urban Public Space Planning and Design from the Perspective of Small Block System," China Master's Theses Full-Text Database (CMFD), Feb. 15, 2019, 128 pages.

* cited by examiner

ARTIFICIAL INTELLIGENCE-BASED URBAN DESIGN MULTI-PLAN GENERATION METHOD FOR REGULATORY PLOT

TECHNICAL FIELD

The present invention belongs to the field of urban planning, and relates to an artificial intelligent urban design generation method, and in particular, to an artificial intelligence (AI)-based urban design multi-plan generation method for a regulatory plot.

BACKGROUND

Artificial Intelligence ("AI" for short) was first proposed at the Dartmouth conference in 1956. The academia has different opinions and definitions for AI for more than 60 years. However, AI is essentially an intelligent machine or system capable of simulating intelligent human activities. As an information environment and a data foundation change, AI achieves development and breakthrough in big data, language and image identification, in-depth learning, and the like, and is applied to actual production and life. AI innovated people's production modes and lifestyle. AI sets off a new artificial intelligence boom around the world. In July 2017, the State Council issued the Development Planning for a New Generation of Artificial Intelligence, officially incorporating the development planning of AI into the national-level development strategy. Different from the impact of a single scientific and technological development on a city, AI has innovated the operation ways of industries, people's living habits, and city governing measures. AI affects city life as well as urban planning and urban design, and promotes the progress and innovation of urban design theories and methods.

The academician Wang Jianguo (2018) systematically sorted the historical development of the urban design concept. Based on an in-depth analysis of the development of urban design disciplines and professional fields at home and abroad, he believes that urban design has undergone traditional urban design, modernistic urban design, and green urban design. At present, a new trend of urban design development with a method and tool characteristic of digitalization emerges, the academic proposition of the fourth generation of Digitalized Urban Design Pattern is proposed, and five innovative values are summarized and analyzed. The fourth generation of urban design aims at the theoretical reconstruction of morphological integrity, and has a core characteristic of innovation by using human-machine interaction digital technologies, methods, and tools. Scientific research and practice results of massive cases show that in the foreseeable future, the planning and design organization unit may achieve digital collection, digital design, and then digital management.

In Artificial Intelligence Assisted Urban Planning, the academician Wu Zhiqiang (2018) explained cognitive points such as a relationship between AI and urban planning in development, the embodiment of mutual propelling, and the development direction of future value orientation, predicted that the technical breakthrough of next-generation AI will bring a huge change in urban research and urban planning, and interprets the frontier dynamics of AI assisted urban planning in combination with the practical application cases.

Wu Huijun and Qiu Canhong (2018) sorted the theoretical connotation and the technological frontier of AI 2.0, said that the new AI technology will have an important impact on a city form, city operation, city governance modes, and city culture, and proposed planning measures for sustainable development of cities. The planning measures include the establishment of a complete and intelligent dynamic planning process system, elaborate and user-friendly spatial governance, multi-body participated planning management, hybrid construction, a shared high-quality urban community, and construction of a multi-level, systematic, efficient, and secure data platform, facilitating construction of a sustainable and intelligent city.

In a specific AI assisted urban design method, by means of a shared urban planning data collection, analysis, and management platform, urban design no longer fails to treat a large-scale urban spatial form as a result of different subjectivity in judgment of a three-dimensional shape. Occasionally, the digital urban design may automatically form a logical system independent of planning, and obtain a unique resolution to problems. For space design, computers have remarkable achievements in analyzing environmental physical attributes and integrating relevant elements, inspiring and promoting designers' ideas, and quickly providing plans for selection, and further aspects.

The existing AI assisted urban design method is a machine learning generative design method focusing on data mining and construction of a case database. Tang Yu, et al. (2019) explored obtaining of traditional spatial shape formation rules independent of human subjective judgment and establishment of digital generative design tools based on data mining and machine learning technologies in the AI field in protection or renewal design of historical characteristics of traditional architectural settlements, to resolve the problem of accurate inheritance and innovative use of historical and cultural information of traditional architectural settlements, and introduced the achievements of application of technical tools such as Case Based Learning in urban update design of urban historical areas in combination of cases. Song Jinghua, et al. explored the actual effect and impact of different algorithms and weight frames on automatic design, and explored the automatic generation of plans under a multi-rule condition during strong emission of a residence zone. Based on the Pareto optimal RBFOpt machine learning black box model optimization algorithm library, the automatic architecture generation method under rule constraints is studied under constraints such as sunshine, a fire spacing, and zoning and grouping according to a type, and corresponding weight values are given. Feasible methods and ideas are provided for owners, planning management departments, and designer to carry out more accurate design condition analysis and economic value evaluation of projects, and solve the optimal plan under a given weight ratio. George Grekousis, et al. (2013) proposed an artificial intelligence method for urban evolution modeling combined with geographic information systems (GISs). The method uses fuzzy logic and a neural network technology, and provides a time and space integration method for analysis, prediction, and explanation of urban growth. The established city model takes into account the changes in population and architecture usage patterns over time. The model is applied to Attica, Greece, describes current and future development trends of Athens Metropolitan Area. and illustrates the trends by using a dynamic map of urban growth, which can help planners and decision makers deeply understand the rural-urban transition.

SUMMARY

In view of the disadvantages of the prior art, the present invention is intended to provide an AI-based urban design multi-plan generation method for a regulatory plot. By means of the AI-based urban design multi-plan generation method for a regulatory plot, the planners realize real-time, accurate, and efficient feedback adjustment to a plurality of urban design plans under regulatory conditions, resolving a plurality of problems such as a long working period of a conventional design plan.

The present invention adopts the following technical solutions: An AI-based urban design multi-plan generation method for a regulatory plot includes operation steps performed by the following modules:

S1: plot space calculation sand table module;
S2: regulatory characteristic parameter input module;
S3: characteristic case intelligent learning module;
S4: plot road intelligent generation module;
S5: plot landscape intelligent generation module;
S6: plot architecture intelligent generation module; and
S7: outputted plan auxiliary drawing module.

Further, S1 Includes the Following Four Steps:

S1.1: collecting two-dimensional vector data of information about architectures and roads surrounding a design plot in a specific range, where the architecture data is a closed polygon and includes information about a quantity of architecture storeys, and the road data includes information about a centerline and a road width of each road;

S1.2: verifying three-dimensional spatial information from oblique photography of the architectures surrounding the design plot by means of on-site collection by using an unmanned aerial vehicle (UAV);

S1.3: adjusting coordinates of the vector data to be consistent, loading, into an AI urban design platform, the two-dimensional vector data of the architectures and the roads surrounding the design plot and the three-dimensional information from the oblique photography of roads forming the regulatory and design plot and the architectures surrounding the plot, and running the data on a computer; and S1.4: performing stretching by using a storey height of 3 m based on the information about the architecture storeys, to obtain a current three-dimensional model of the architectures surrounding the design plot; and generating a three-dimensional model of the roads surrounding and forming the design plot based on information about a road centerline and a road elevation point and a road width value, so as to establish a basic sand table for plot space calculation.

Further, S2 Includes the Following Two Steps:

S2.1: scanning regulatory plan maps and drawings of the plot by using a scanner, to obtain the regulatory plot index data of the design plot, where the regulatory plot index data includes a land property of each block, locations of entrances and exits in each block, a development intensity (an architecture density, an architecture height, and a plot ratio) of each block, an architecture discount rate, and an architecture setback line; and S2.2: inputting the regulatory plot space parameters to an AI urban design platform, and spatially establishing a connection to the current three-dimensional model of the architectures surrounding the design plot and the three-dimensional model of the roads surrounding and forming the design plot.

Further, S3 Includes the Following Two Steps:

S3.1: acquiring a case database of a current construction plan of urban design, and extracting a characteristic index system of the urban design plan case; and S3.2: prioritizing characteristic parameters, establishing a characteristic index system decision tree, and selecting similar cases based on the decision tree, to form a characteristic learning case database.

Further, S4 Includes the Following Four Steps:

S4.1: forming a hidden grid of 30 m×30 m between an entrance and an exit that are determined, automatically finding and connecting a shortest path between the entrance and the exit on the ultra-deep computer, and repeating the steps until all entrances and exits of each block of the plot in S4.1 are connected by a shortest path.

S4.2: forming a road centerline of the design plan according to S4.1, and automatically widening a road on the ultra-deep computer in accordance with the specification for urban branch road;

S4.3: verifying the plan generated in S4.2 in accordance with the block scale specification and the road density specification in specification parameters in GB50220-95 Code for Transport Planning on Urban Road that have different functions, and eliminating road plans that do not conform to the specifications; and S4.4: outputting, on the printer, road network plans that conform to the specifications of S4.3, and generating interactive parameters of the road network plans, where the interactive parameters include road network density and uniformity, road network accessibility, and road network connectivity.

Further, S5 Includes the Following Six Steps:

S5.1: setting a point in a block in a non-residential land that nears an external road by using a uniform distribution method as a starting point for generating the landscape system;

S5.2: setting parameters of a basic unit for generating the landscape system: an open angle range $\alpha$ and a length range li;

S5.3: configuring a landscape system on the ultra-deep computer to generate a fitness function;

S5.4: causing the basic unit to grow by using the starting point generated for the landscape system, by using the evolutionary algorithm L-System on the ultra-deep computer; and stopping the growth of the basic unit when the landscape system in each block of the non-residential land is connected and an evolved tree structure is connected to all urban roads on boundaries of the non-residential blocks;

S5.5: verifying the generated plans in accordance with parameters of the landscape system specification based on the tree structure of the landscape system (separation of people from vehicles—a landscape road does not overlap a vehicle road, is connected to a non-residential public functional block, and is connected to a peripheral public functional block); and S5.6: outputting, on the printer, the landscape system plan verified by using the specifications in S5.5, and generating interactive parameters of the landscape system plan, where the interactive parameters include a street block quantity, a street block area, and a street block shape index.

Further, S6 Includes the Following Six Steps:

S6.1: constructing a sample database of architectural combination forms, including: collecting and vectorizing data of architectural combination samples, intercepting architectural combination image data by using the Google Map, and vectorizing architecture boundaries and roads;

S6.2: extracting characteristic indexes of the architectural combination samples (including a street block shape, a street block area, an architecture density, a plot ratio, and a land property) (calculating the architecture density based on an architecture area and the street block area; recognizing an architecture height by using an architecture shadow and calculating the floor area ratio; and recognizing an architecture function and the land property according to an architecture shape);

S6.3: performing intelligent matching on the case database of the architectural combinations, including: comparing an interaction index of each street block with the case database, arranging sample architectural combinations having a matching degree of 90% according to the matching degree, and selecting first 1000 architectural combinations having the matching degree to generate a case learning database;

S6.4: performing machine learning by using the first 1000 architectural combinations as data of the CVAE-GAN complementation algorithm and the architecture adaptive algorithm to generate intelligent architectural combination plans for different functions of each street block;

S6.5: performing verification based on the regulatory plot space parameters (a development intensity of each block (an architecture density, an architecture height, a plot ratio) inputted in S2, an architecture discount rate, and an architecture setback line) and a residential architecture sunshine spacing, and eliminating plans that do not conform to the specifications; and S6.6: outputting architectural combination plans that conform to the specifications of sunshine and fire protection, and generating interactive parameters of the architectural combination plans, where the interactive parameters include skyline profile volatility of the architectural combination plans.

Further, S7 Includes the Following Four Steps:

S7.1: hierarchically outputting and merging road-landscape-architecture plans, classifying roads, landscapes, and architectures in the plans into layers in a GIS data format and successively naming the roads, landscape and architectures as architecture, road, and landscape, and importing the data into an AI urban design platform;

S7.2: combining, in a three-dimensional data platform, the plan data extracted in S7.1 with a rule verification parameter report and the design characteristic parameters obtained in S4.4, S5.6, and S6.6, outputting a multi-plan report data table and forming an engineering report drawing, and printing the engineering report drawing in a text format by a laser printer;

S7.3: combining, in the three-dimensional data platform, the plan data extracted in S7.1 with the current three-dimensional real scene data obtained in S1, adjusting the coordinates, so that the two pieces of data are in a same coordinate system, setting a plurality of observation points in a new three-dimensional model database, generating and exporting a new urban scene after planning and design in the AI urban design platform; and S7.4: wearing virtual reality glasses to perform scene roaming simulation of the observation points of the urban design plan determined in S7.3.

Beneficial effects of the present invention are as follows:

1. The present invention makes up for the deficiencies of an existing image learning method in urban design. The AI technology has now been widely applied to space, ecology, transportation, culture, public administration, and the like. The application to space mainly includes an urban image research based on a computer vision technology, a generative design tool based on data mining and machine learning, and intelligent construction of an urban space model. In recent years, the combination of computer vision and urban research has introduced a series of innovative researches, forming an interdisciplinary research field having great potential. However, due to the uncontrollability of intelligent generation means such as existing image learning, excessive invalid plans are usually generated, failing to satisfy the actual needs of the current urban design.

2. The present invention adopts a hierarchical design idea, and provides hierarchical design and optimization corresponding to different systems. A current intelligent urban design method from Shenzhen Xkool is mainly oriented to a residential zone with a single function and adopts strong emission and model selection, and therefore is inapplicable to a design site of a district with hybrid functions. The design idea based on architectural arrangement mainly reflects a hierarchical design idea oriented toward architectures. The design idea is applicable to a small-scale area with a single function. However, since the urban design pays more attention to the control of an overall spatial form and creation of a style of a city, connection between functions, spaces, scenes, traffic, and landscapes of different blocks are required to be emphasized. The present invention adopts a hierarchical design idea, and provides hierarchical design and optimization corresponding to different systems.

3. The present invention is of significance and widely used in matchmaking between district-scale urban design and a regulatory plan. In urban design, it is often required to develop a variety of three-dimensional morphological possibilities for each street block in case of a fixed total quantity of streets, so as to coordinate the setting and the adjustment of the distribution of the total quantity of developments and indexes among a plurality of blocks. In addition, it is required to consider corresponding detailed three-dimensional architecture volumes under various development intensity distribution settings for control of urban form within the entire planning range. For a long time, generating the form from the indexes is manually completed by a large number of assistant designers in the design organization. When it is required to adjust the index setting of each neighborhood, the above process needs to be repeated. The workload is huge, directly affecting the enthusiasm in design and consideration, affecting the design quality.

DETAILED DESCRIPTION

The technical solutions of the embodiments of the present invention are clearly and completely described in the following with reference to the accompanying drawings of the embodiments of the present invention.

Figure 1:
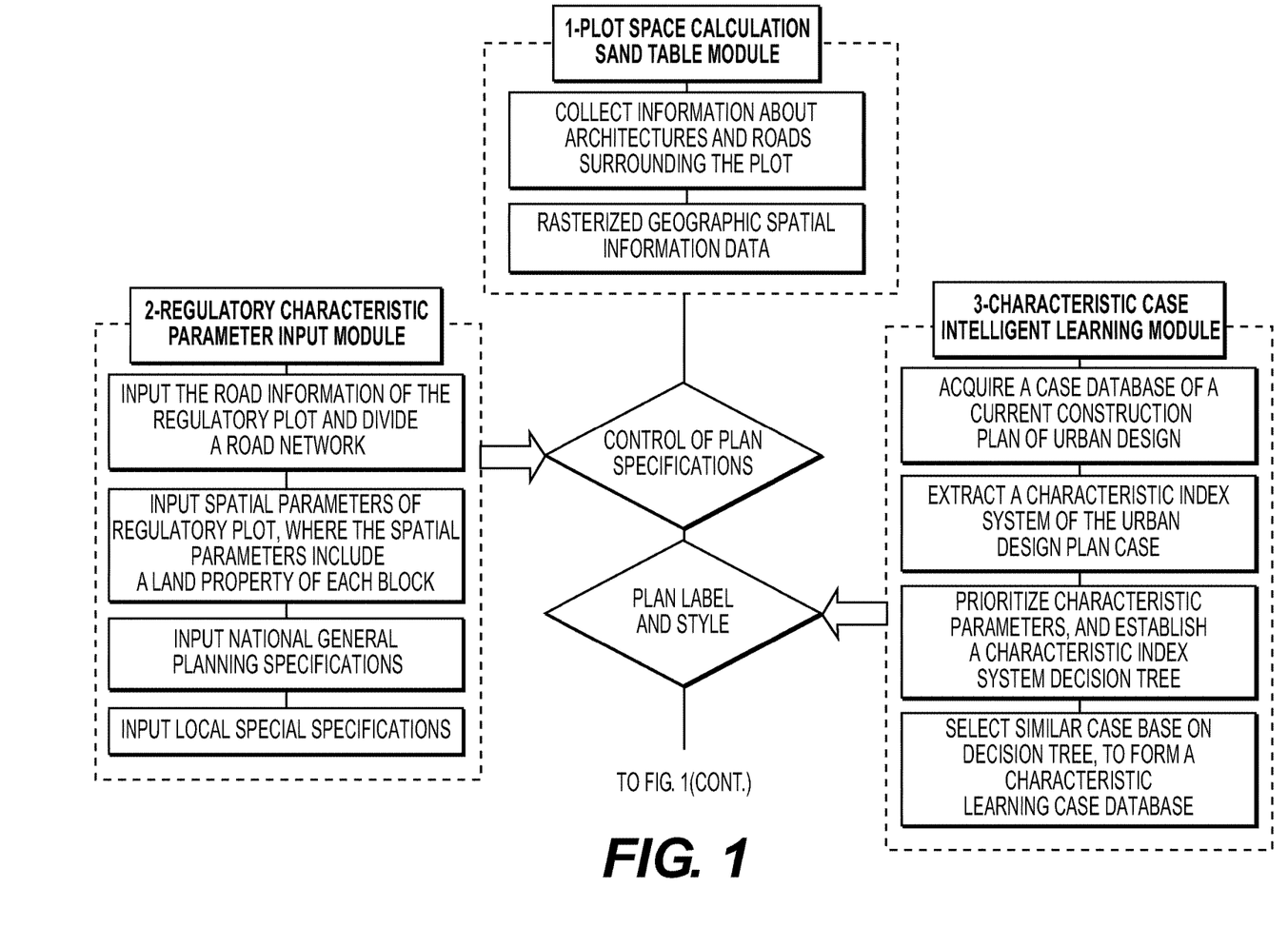
FIG. 1 is an overall flowchart of a method according to an embodiment of the present invention.

As shown in FIG. 1, an AI-based urban design multi-plan generation method for a regulatory plot includes operation steps:

S1: A plot space calculation sand table module collects two-dimensional vector data of information about architectures and roads surrounding a design plot in a specific range and three-dimensional spatial information from oblique photography of surrounding architectures.

S1 Includes the Following Four Steps:
- S1.1: collecting the two-dimensional vector data of the information about the architectures and the roads surrounding a design plot in a specific range, where the architecture data is a closed polygon and includes information about a quantity of architecture storeys, and the road data includes information about a centerline and a road width of each road;
- S1.2: verifying the three-dimensional spatial information from the oblique photography of the architectures surrounding the design plot by means of on-site collection by using a UAV;
- S1.3: adjusting coordinates of the vector data to be consistent, loading, into the AI urban design platform, the two-dimensional vector data of the architectures and the roads surrounding the design plot and the three-dimensional information from the oblique photography of roads forming the regulatory and design plot and the architectures surrounding the plot, and running the data on a computer; and
- S1.4: performing stretching by using a storey height of 3 m based on the information about the architecture storeys, to obtain a current three-dimensional model of the architectures surrounding the design plot; and generating a three-dimensional model of the roads surrounding and forming the design plot based on information about a road centerline and a road elevation point and a road width value, so as to establish a basic sand table for plot space calculation.

S2: A regulatory characteristic parameter input module acquires data, in a computer aided design (CAD) format, of roads forming plots in a regulatory plan of the design plot in a master plan and regulatory plot index data of the design plot, and adjusts coordinates of the vector data to be consistent and connect regulatory indexes to an architecture-road space model of the design plot.

S2 Includes the Following Two Steps:
- S2.1: scanning regulatory plan maps and drawings of the plot by using a scanner, to obtain the regulatory plot index data of the design plot, where the regulatory plot index data includes a land property of each block, locations of entrances and exits in each block, a development intensity (an architecture density, an architecture height, and a plot ratio) of each block, an architecture discount rate, and an architecture setback line; and
- S2.2: inputting the regulatory plot space parameters to an AI urban design platform, and spatially establishing a connection to the current three-dimensional model of the architectures surrounding the design plot and the three-dimensional model of the roads surrounding and forming the design plot.

S3: A characteristic case intelligent learning module acquires a case database of a current construction plan of urban design, extracts a characteristic index system of the urban design plan case, prioritizes characteristic parameters, establishes a characteristic index system decision tree, and selects similar cases based on the decision tree, to form a characteristic learning case database.

S3 Includes the Following Two Steps:
- S3.1. acquiring the case database of the current construction plan of urban design, and extracting the characteristic index system of the urban design plan case; and
- S3.2. prioritizing the characteristic parameters, establishing the characteristic index system decision tree, and selecting the similar cases based on the decision tree, to form the characteristic learning case database.

S4: A plot road intelligent generation module intelligently generates a plurality of plans for a plot road network by using a combination of a gridding method and a shortest path method according to locations of entrances and exits of each block determined in the regulatory plan, verifies the plans by using a road specification verification model, and outputs road network plans that conform to specifications and characteristic parameters of the plans.

S4 Includes the Following Four Steps:
- S4.1: forming a hidden grid of 30 m×30 m between an entrance and an exit that are determined, automatically finding and connecting a shortest path between the entrance and the exit, and repeating the steps until all entrances and exits of each block of the plot in S4.1 are connected by a shortest path;
- S4.2: forming a road centerline of the design plan according to S4.1, and automatically widening a road in accordance with the specification for urban branch road;
- S4.3: verifying the plan generated in S4.2 in accordance with the block scale specification and the road density specification in specification parameters in GB50220-95 Code for Transport Planning on Urban Road that have different functions, and eliminating road plans that do not conform to the specifications; and
- S4.4: outputting road network plans that conform to the specifications of S4.3, and generating interactive parameters of the road network plans, where the interactive parameters include road network density and uniformity, road network accessibility, and road network connectivity.

S5: A plot landscape intelligent generation module intelligently generates a landscape system multi-plan according to a land property of each block determined in the regulatory plan and the road network plan intelligently generated in S4 by using a combination of parameter control of a basic landscape unit and an evolutionary algorithm, verifies the plan by using a landscape system rule verification model, and outputs landscape system plans that satisfy the rules and characteristic parameters of the plans.

S5 Includes the Following Six Steps:
- S5.1: setting a point in a block in a non-residential land that nears an external road by using a uniform distribution method as a starting point for generating the landscape system;
- S5.2: setting parameters of a basic unit for generating the landscape system: an open angle range $\alpha$, a length range $l_i$, and a range of a crossroad quantity;
- S5.3: configuring a landscape system to generate a fitness function;
- S5.4: causing the basic unit to grow by using the starting point generated for the landscape system, by using the evolutionary algorithm L-System; and stopping the growth of the basic unit when the landscape system in each block of the non-residential land is connected and an evolved tree structure is connected to all urban roads on boundaries of the non-residential blocks;

S5.5. verifying the generated plans in accordance with parameters of the landscape system specification based on the tree structure of the landscape system (separation of people and vehicles—a landscape road does not overlap a vehicle road, is connected to a non-residential public functional block, and is connected to a peripheral public functional block); and S5.6: outputting the landscape system plan verified by using the specifications in S5.5, and generating interactive parameters of the landscape system plan, where the interactive parameters include a street block quantity, a street block area, and a street block shape index.

S6: A plot architecture intelligent generation module constructs a sample database of architectural combinations, intelligently matches characteristic indexes of the sample database of the architectural combinations of the design plot with a case database of the architectural combinations, to generate a plan case learning database, generates architectural combination plans with different functions by using a CVAE-GAN complementation algorithm and an adaptive algorithm, verifies the plans by using regulatory plot space parameters and a sunshine spacing, and outputs architectural combination plans that satisfy the rules and characteristic parameters of the plans.

S6 Includes the Following Six Steps:

S6.1: constructing a sample database of architectural combination forms on an ultra-deep computer, including: collecting and vectorizing data of architectural combination samples, intercepting architectural combination image data by using the Google Map, and vectorizing architecture boundaries and roads;

S6.2: extracting characteristic indexes of the architectural combination samples (including a street block shape, a street block area, an architecture density, a plot ratio, and a land property) (calculating the architecture density based on an architecture area and the street block area; recognizing an architecture height by using an architecture shadow and calculating the floor area ratio; and recognizing an architecture function and the land property according to an architecture shape);

S6.3: performing intelligent matching on the case database of the architectural combinations, including: comparing an interaction index of each street block with the case database, arranging sample architectural combinations having a matching degree of 90% according to the matching degree, and selecting first 1000 architectural combinations having the matching degree to generate a case learning database;

S6.4: performing machine learning by using the first 1000 architectural combinations as data of the CVAE-GAN complementation algorithm and the architecture adaptive algorithm to generate intelligent architectural combination plans for different functions of each street block;

S6.5: performing verification based on the inputted regulatory plot space parameters (a development intensity of each block (an architecture density, an architecture height, a plot ratio), an architecture discount rate, and an architecture setback line) inputted in S2 and a residential architecture sunshine spacing, and eliminating plans that do not conform to the specifications; and S6.6: outputting, on the printer, architectural combination plans that conform to the specifications of sunshine and fire protection, and generating interactive parameters of the architectural combination plans, where the interactive parameters include skyline profile volatility of the architectural combination plans.

S7: An outputted plan auxiliary drawing module outputs GIS data after integration of road-landscape-architecture plans, and outputs a rule verification parameter report and a design characteristic parameter report data table, to form an engineering report drawing and printing the engineering report drawing, inputs the GIS data into a visualization platform system, and interactively displays the GIS data to citizens.

S7 Includes the Following Four Steps:

S7.1: hierarchically outputting and merging the road-landscape-architecture plans, classifying roads, landscapes, and architectures in the plans into layers in a GIS data format and successively naming the roads, landscape and architectures as architecture, road, and landscape, and importing the data into an AI urban design platform;

S7.2: combining, in the three-dimensional data platform, the plan data extracted in S7.1 with the rule verification parameter report and the design characteristic parameters obtained in S4.4, S5.6, and S6.6, outputting a multi-plan report data table and forming an engineering report drawing, and printing the engineering report drawing in a text format by a laser printer;

S7.3: combining, in the three-dimensional data platform, the plan data extracted in S7.1 with the current three-dimensional real scene data obtained in S1, adjusting the coordinates, so that the two pieces of data are in a same coordinate system, setting a plurality of observation points in a new three-dimensional model database, generating and exporting a new urban scene after planning and design in the AI urban design platform; and S7.4: wearing virtual reality glasses to perform scene roaming simulation of the observation points of the urban design plan determined in S7.3.

The basic principles, main features and advantages of the present invention have been shown and described above. Those skilled in the art should understand that the present invention is not limited by the above-mentioned embodiments. The foregoing embodiments and the description in the specification only illustrate the principle of the present invention. Without departing from the spirit and scope of the present invention, there will be various changes and improvements in the present invention, and these changes and improvements fall within the scope of the claimed invention.

What is claimed is:

1. An artificial intelligence (AI)-based urban design multi-plan generation method for a regulatory plot, the method comprising the following operation steps:

(a) collecting two-dimensional vector data of surrounding architectures and roads, verifying three-dimensional spatial information via an unmanned aerial vehicle (UAV) oblique photography, and generating a 3D model by stretching architectures based on storey quantities and forming roads based on centerline and width data;

(b) scanning regulatory plan maps to obtain index data comprising land properties, entrance and exits locations, a development intensity, discount rates, and setback lines; and (c) inputting regulatory parameters and spatially linking to the 3D model;

(d) acquiring an urban design case database, extracting a characteristic index system, and selecting similar cases via a decision tree;

(e) generating road network plans by:
 (i) forming a hidden grid between entrances and exits,
 (ii) connecting shortest paths iteratively,
 (iii) widening roads to comply with urban branch road specifications; and
 (iv) verifying compliance with regulatory codes, and
 (v) generating parameters for road network density, uniformity, accessibility, and connectivity, and (f) generating landscape system plans by:
 (i) setting a starting point in non-residential blocks,
 (ii) configuring a basic unit with predefined open angle range $\alpha$ and length range li;
 (iii) growing units via an L-System evolutionary algorithm until connectivity is achieved;
 (iv) verifying separation from vehicle roads, and
 (v) generating parameters for block quantity, area, and shape index;

(g) generating architectural combination plans by:
 (i) constructing a sample database via vectorization;
 (ii) matching cases with ≥90% similarity to select samples;
 (iii) training a CVAE-GAN model to generate combinations;
 (iv) verifying compliance with regulatory parameters and sunshine spacing;
 (v) generating parameters for skyline profile volatility; and (h) merging plans, into GIS layers, generating a report, and simulating scenes via virtual reality glasses.

2. The method of claim 1, wherein the hidden grid in step (e)(i) has a size of 30 m×30 m.

\* \* \* \* \*